Dec. 6, 1949     L. F. BIRD     2,490,011
ULTRAVIOLET RAY INTENSITY METER
Filed June 11, 1947
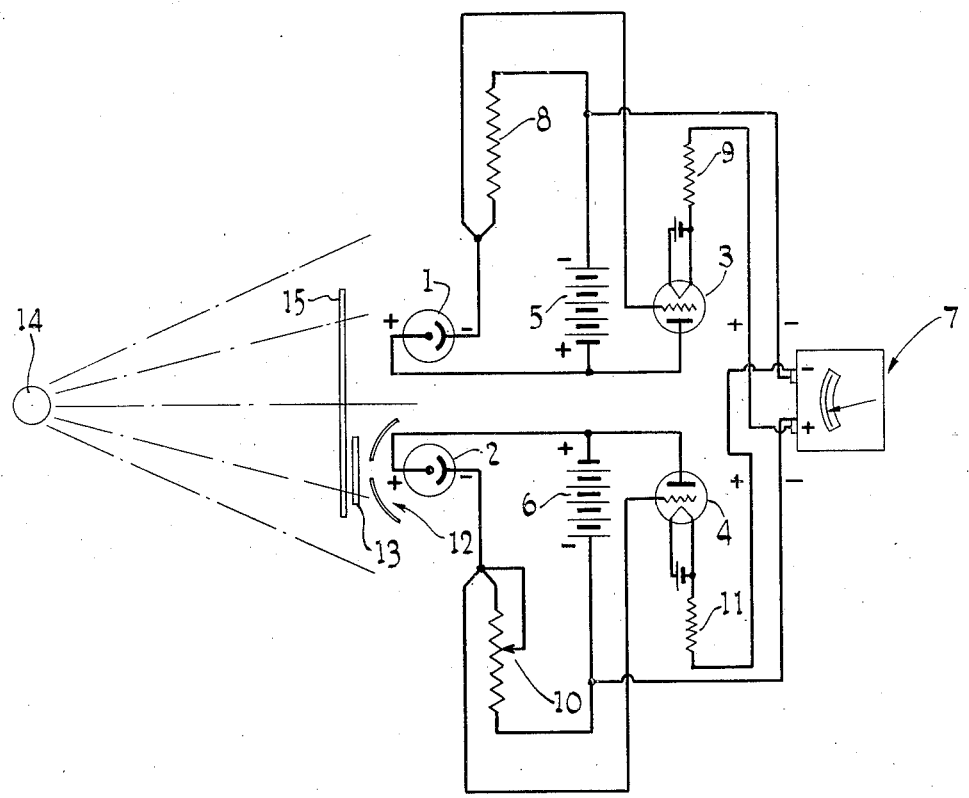
INVENTOR.
LESTER F. BIRD
BY
ATTORNEY Patented Dec. 6, 1949

2,490,011

UNITED STATES PATENT OFFICE 2,490,011

ULTRAVIOLET RAY INTENSITY METER

Lester F. Bird, Newark, N. J., assignor to Hanovia Chemical & Manufacturing Company, Newark, N. J., a corporation of New Jersey Application June 11, 1947, Serial No. 753,887

9 Claims. (Cl. 250—83.3)

This invention is concerned with an ultraviolet ray intensity meter and more particularly with a device and means for the measurement of ultraviolet rays.

The increasing use of ultraviolet lamps for photochemical and biological reactions has emphasized the need for better meters for the measurement of the lamp output. Meters heretofore developed for the measurement of ultraviolet rays have been found deficient in that such meters require conversion means to translate meter responses into absolute energy. Such meters, therefore, have the disadvantage of not readily providing an accurate reading of absolute energy, and are not adapted to readily measure only the amount of ultraviolet radiation of the lamp.

Light sources normally radiate ultraviolet light of various wave lengths including bactericidal wave lengths, erythema producing wave lengths, vitamin D producing wave lengths, etc., as well as visible radiations and the meter of this invention is designed to indicate and measure the intensity of particular ranges of ultraviolet wave lengths, e. g. bactericidal wave lengths.

It is one object of this invention to provide an indicating meter giving an accurate and direct reading that is directly proportional to the intensity of ultraviolet radiation of a particular designated range of ultraviolet wave lengths which emanates from a light source and which is directed at the device comprising such meter. It is another object of this invention to provide a device wherein the effect of photocells in a differential combination is balanced out for all radiations except the radiations of a particular designated range of ultraviolet wave lengths. It is a further object of this invention to provide a device that is uniformly sensitive to a designated range of ultraviolet energy and which is adapted to be unresponsive to all other regions of the spectrum. Other objects and advantages of this invention will become apparent from the following description in relation to the drawing forming part hereof in which the single figure represents a diagrammatic view of this invention, including the circuit therefor.

The ultraviolet light meter of this invention is a simple direct-reading meter for the measurement of ultraviolet rays, e. g. germicidal rays or erythema producing rays, and is adapted to give the light intensity within these regions in absolute energy units. The meter readings indicated are directly proportional to the strength of the light. The meter can be operated from the common supply sources, such as 110 volts A. C. and can be independent of the variations in voltage usually encountered.

Two vacuum photocells 1 and 2 of a type especially adapted for this purpose are employed in a meter device in a balanced combination with two amplifier tubes 3 and 4 operating on suitable direct current operating supplies. Since direct current is necessary in all measurements of pulsating light sources to avoid errors due to phase angles between the photocell supplies and the light where rectified A. C. is used, two separate sources of A. C. may be provided which are rectified to give two independent sources of D. C. equivalent to the batteries 5 and 6 for the photocells and the amplifier tubes. An indicating meter 7 is placed in a common electrical circuit for the two amplifier tubes. These tubes are connected with 100% inverse feed back which results in the meter being independent of tube characteristics. Changing tubes, therefore, does not materially affect the calibration. One of these photocells is connected in the usual manner from one of the plus D. C. supplies through a suitable resistor 8. The voltage developed across this resistor is applied directly to the grid of one amplifier tube. The grid is returned to the cathode circuit outside of another resistor 9 and the indicating meter 7 in the electrical circuit. This tube is normally biased to cut-off by the voltage developed across the cathode resistor 9. The cathode current of this tube 1 drives the meter reading up the scale. The second photocell 2 is connected in a similar manner to the second amplifier tube with the variation that the resistor 10 can be variable to regulate the response of this cell. Photocell 2, with its amplifier, is connected through the indicating meter in reverse to that of photocell 1 and its amplifier and makes the indication on the meter go down the scale. An adjustable gate 12 may be provided for the cell 2 to regulate the amount of light reaching it. Cell 2 also has provided a corex D. filter glass 13. Since no short ultraviolet or germicidal rays are transmitted through the corex D. glass, the response of cell 2 is entirely due to long wave length radiations.

In operation, the pair of cells are mounted side by side to receive light from the source 14. In the measuring of short wave germicidal radiations, for instance, a corex D. 15 glass filter, which does not transmit radiations as short as 2537 Angstroms, is placed between the light source on the one hand and the two cells on the other hand. The movable gate 12 of the second cell 2 is then adjusted so as to bring the indicating meter 7 to zero. The corex D. auxiliary cover 15 is next removed allowing the light to fall on the first cell and on the corex D. 13 covering the second one. If no germicidal rays are present, there will be no reading because the cells are balanced for radiations passing corex D. glass. Where there are rays to measure, the meter indicates with a sensitivity of about 5 microamperes per microwatt per cm.² of light falling on the cells. The sensitivity is adequate for most locations, but can be increased if necessary by alterations of the amplifier. Experimental use has demonstrated the entire reliability and outstanding performance of this meter.

This ultraviolet meter can be modified to measure the erythema producing ultraviolet from a high pressure mercury arc lamp or other source by the simple modification of utilizing the proper photocells in the balanced light receiver combination. Cells employed for this purpose cannot be very responsive to visible light, or the cells become saturated and, therefore, do not have sufficient voltage to operate properly. This difficulty is overcome by using a photocell for the ultraviolet receiver having its sensitivity between 2200 and 4200 Angstroms. In the case of the balance cell, I can utilize any cell which has a sensitivity in the long ultraviolet and visible light. Such long ultraviolet and visible light is filtered so that the cell has no response below 3200 Angstroms. The combination of cells of these types may have very little sensitivity for visible light and consequently does not result in the cells becoming saturated. One cell is connected to give a positive reading on the indicating instrument and the other a negative reading. This cell combination inherently has the proper cut-off and sensitivity regions to measure the vitamin D or erythema producing rays. A cover for the cells which can be made of chemical Pyrex glass or very clear polished window glass having little or no transmission below 3200 Angstroms can be used for balancing the reading of the meter to zero for the longer wave lengths, e. g. above 3200 Angstrom units. Upon the removal of the glass only the radiations to which the cells are not balanced produce a deflection on the indicating instrument.

From the above description, it is apparent that the ultraviolet ray intensity meter of this invention directly indicates the intensity of a particular designated range of ultraviolet wave lengths in absolute energy units when properly calibrated.

This light meter is unique in its ability to be utilized for measurement of light in any particular designated ultraviolet region without the disadvantage of having to spectralize the light. It is unique in that the region being measured can be readily adjusted and will remain constant. It, therefore, offers many advantages over other previous types of instruments.

The invention, consequently, provides a device adapted to indicate and measure the intensity of any particular wave length range of ultraviolet radiations, e. g. bactericidal, erythema producing, vitamin D producing or otherwise, as may be desired, included in the radiation of ultraviolet rays from a light source, with or without the presence of visible light radiations, wherein there is provided a filter opaque to the rays to be indicated and measured and transparent to the other radiations positioned to intercept the radiations from the light source and to allow only the radiations which are not to be indicated and measured to fall upon a plurality of photocells at least one of which is sensitive to the particular wave length range to be indicated and measured and at least one of which is sensitive to other radiations, said photocell which is sensitive to radiations other than the radiations to be indicated and measured is provided with a responsive regulating means, e. g. a variable resistor or an adjustable gate, and a filter that is opaque to the particular wave length range to be indicated and measured and transparent to other radiations, electronic amplifier means for the plurality of photocells, an indicating instrument in a common electric circuit with the photocells and their amplifiers and adapted to balance out any indication of radiations other than the particular wave length range of ultraviolet radiations to be indicated and measured so that when the auxiliary filter which intercepts the radiations from a light source is removed, the meter will indicate and measure only the response of the photocell which is sensitive to the particular wave length range of ultraviolet radiations to be indicated and measured.

What I claim is:

1. A device for indicating and measuring the intensity of ultraviolet rays of a particular wave length range emanating from a source of ultraviolet radiations, comprising a light sensitive means of at least two vacuum photocells in a differential combination, at least one vacuum photocell being sensitive to the wavelength range to be indicated and measured and at least one balancing vacuum photocell being sensitive to other radiations, filter means opaque to the particular wavelength range to be indicated and measured and transparent to other radiations, said filter means comprising a balancing filter positioned between the light source and said light sensitive means and a filter positioned only between the light source and said balancing photocell, a source of D. C. current, suitable resistors and an electronic amplifier for the balancing photocell, a source of D. C. current, suitable resistors and an electronic amplifier for the photocell sensitive to the wavelength range to be indicated and measured, an indicating meter, said amplifier for the balancing photocell being connected through said indicating meter in reverse to that of the amplifier for the photocell sensitive to the wavelength range to be indicated and measured, said indicating meter being capable of balancing out indications of all radiations other than the radiations of a designated range of ultraviolet wavelength.

2. A device for indicating the intensity of ultraviolet rays, comprising a light sensitive means of at least two vacuum photocells in a differential combination, at least one vacuum photocell being sensitive to short ultraviolet radiations and at least one balancing vacuum photocell being sensitive to visible and long ultraviolet radiations, filter means opaque to short ultraviolet radiations and transparent to visible and long ultraviolet radiations, said filter means comprising a balancing filter positioned between a light source and said light sensitive means and a filter positioned only between the light source and said balancing photocell, a source of D. C. current, suitable resistors and an electronic amplifier for the balancing photocell, a source of D. C. current, suitable resistors and an electronic amplifier for the photocell sensitive to short ultraviolet radiations, an indicating meter, said amplifier for the balancing photocell being connected through said indicating meter in reverse to that of the amplifier for the photocell sensitive to short ultraviolet radiations, said indicating meter being capable of balancing out indications of radiations other than the short ultraviolet.

3. A device for indicating the intensity of ultraviolet rays, comprising a light sensitive means of two vacuum photocells in a differential combination, one vacuum photocell being sensitive to short ultraviolet radiations and the other being a balancing vacuum photocell sensitive to visible and long ultraviolet radiations, filter means opaque to said short ultraviolet radiations and transparent to visible and long ultraviolet radiations, said filter means comprising a balancing filter positioned between a light source and said light sensitive means and a filter positioned only between the light source and said balancing photocell, a source of D. C. current, suitable resistors and an electronic amplifier for the photocell sensitive to short ultraviolet radiations, a source of D. C. current, suitable resistors and an electronic amplifier for the balancing photocell, an indicating meter, said short ultraviolet radiation sensitive photocell and its amplifier being connected through said indicating meter in reverse to that of the visible and long ultraviolet sensitive photocell and its amplifier so that each photocell and its amplifier produces an opposite deflection on said indicating meter, said indicating meter being capable of balancing out indications of radiations other than the short ultraviolet.

4. A device according to claim 3 wherein a photocell sensitive to the visible and long ultraviolet radiations has supplemented thereto a response regulating means comprising an adjustable gate.

5. A device according to claim 3 wherein a photocell sensitive to the visible and long ultraviolet radiations has a response regulating means comprising a variable resistor.

6. A device for indicating the intensity of ultraviolet rays, comprising a light sensitive means of two vacuum photocells in a differential combination, one vacuum photocell being sensitive to ultraviolet erythema producing radiations and the other being a balancing vacuum photocell sensitive to visible and long ultraviolet radiations, filter means opaque to said erythema producing radiations and transparent to visible and long ultraviolet radiations, said filter means comprising a balancing filter positioned between a light source and said light sensitive means and a filter positioned only between the light source and said balancing photocell, a source of D. C. current, suitable resistors and an electronic amplifier for the photocell sensitive to erythema producing radiations, a source of D. C. current, suitable resistors and an electronic amplifier for the balancing photocell, an indicating meter, said erythema radiation sensitive photocell and its amplifier being connected through said indicating meter in reverse to that of the visible and long ultraviolet sensitive photocell and its amplifier so that each photocell and its amplifier produces an opposite deflection on said indicating meter, said indicating meter being capable of balancing out indications of radiations other than erythema producing radiations.

7. A device for indicating the intensity of ultraviolet rays, comprising a light sensitive means of two vacuum photocells in a differential combination, one vacuum photocell being sensitive to vitamin D producing radiations and the other being a balancing vacuum photocell sensitive to visible and long ultraviolet radiations, filter means opaque to said vitamin D producing radiations and transparent to visible and long ultraviolet radiations, said filter means comprising a balancing filter positioned between a light source and said light sensitive means and a filter positioned only between the light source and said balancing photocell, a source of D. C. current, suitable resistors and an electronic amplifier for the photocell sensitive to vitamin D producing radiations, a source of D. C. current, suitable resistors and an electronic amplifier for the balancing photocell, an indicating meter, said vitamin D radiation sensitive photocell and its amplifier being connected through said indicating meter in reverse to that of the visible and long ultraviolet radiations and its amplifier so that each photocell and its amplifier produces an opposite deflection on said indicating meter, said indicating meter being capable of balancing out indications of radiations other than vitamin D producing radiations.

8. A device for indicating the intensity of ultraviolet radiations, comprising a light sensitive means of two vacuum photocells in a differential combination, one vacuum photocell having a sensitivity between 2200 and 4200 A. and the other being a balancing vacuum photocell and having a sensitivity of 3200 A. and above, filter means opaque to radiations below 3200 A. and transparent to longer radiations, said filter means comprising a balancing filter positioned between a light source and said light sensitive means and a filter positioned only between the light source and the balancing photocell, a source of D. C. current, suitable resistors and an electric amplifier for the photocell having a sensitivity between 2200 and 4200 A., a source of D. C. current, suitable resistors and an electronic amplifier for the balancing photocell, an indicating meter, said photocell having a sensitivity between 2200 and 4200 A. and its amplifier being connected through said indicating meter in reverse to that of the balancing photocell and its amplifier so that each photocell and its amplifier tends to produce an opposing deflection on said indicating meter, said indicating meter being capable of balancing out indications of all radiations other than radiations of a designated range of ultraviolet wavelength.

9. A method for indicating and measuring the intensity of a particular wave length range of ultraviolet radiations, comprising positioning a light sensitive means comprising a plurality of photocells at least one of which is sensitive to the particular wave length range of ultraviolet radiations to be indicated and measured and at least one of which is sensitive to other radiations so that the plurality of photocells receive radiations from a light source, interposing an auxiliary filter between said light source and said light sensitive means, said auxiliary filter being opaque to the particular wave length range of ultraviolet radiations to be indicated and measured and transparent to other radiations, providing the photocell which is sensitive to radiations other than those being indicated and measured with a response regulating means and a filter that is transparent to such radiations and opaque to the particular wave length range to be indicated and measured, providing electronic amplifier means for the plurality of photocells, placing an indicating instrument in a common electric circuit with the photocells and their amplifiers, connecting the cathodic circuit of the photocells and their amplifiers to said indicating instrument so that the response of one photocell and its amplifier produces an opposing deflection on said indicating instrument to that of another photocell and its amplifier, adjusting the response regulating means to balance the resultant deflection to read zero on said indicating instrument, removing the auxiliary filter and allowing the light from the light source to fall upon the light sensitive means to produce a deflection on the indicating instrument which is balanced to indicate the intensity of only the particular wave length range of ultraviolet radiations desired.

LESTER F. BIRD.

REFERENCES CITED

The following references are of record in the file of this patent:

UNITED STATES PATENTS

| Number | Name | Date |
| --- | --- | --- |
| 1,963,185 | Wilson | June 19, 1934 |
| 2,114,163 | Bird | Apr. 12, 1938 |
| 2,265,357 | Demarest | Dec. 9, 1941 |